(12) United States Patent
Skjold-Larsen

(10) Patent No.: US 9,119,383 B2
(45) Date of Patent: Sep. 1, 2015

(54) METHOD FOR DETERMINING DIFFERENCE IN DISTANCE

(76) Inventor: Henning Skjold-Larsen, Tonsberg (NO)

(*) Notice: Subject to any disclaimer, the term of this patent is extended or adjusted under 35 U.S.C. 154(b) by 938 days.

(21) Appl. No.: 13/147,529

(22) PCT Filed: Jan. 29, 2010

(86) PCT No.: PCT/NO2010/000037
§ 371 (c)(1),
(2), (4) Date: Sep. 16, 2011

(87) PCT Pub. No.: WO2010/090526
PCT Pub. Date: Aug. 12, 2010

(65) Prior Publication Data
US 2012/0002507 A1    Jan. 5, 2012

(30) Foreign Application Priority Data

Feb. 3, 2009   (NO) .................................... 20090529
Apr. 30, 2009  (NO) .................................... 20091726

(51) Int. Cl.
*G01S 11/00* (2006.01)
*A01K 73/04* (2006.01)
*G01S 11/14* (2006.01)

(52) U.S. Cl.
CPC *A01K 73/04* (2013.01); *G01S 11/14* (2013.01)

(58) Field of Classification Search
CPC ................................. A01K 73/04; G01S 11/14
USPC .......................................... 367/127, 129, 19
See application file for complete search history.

(56) References Cited

U.S. PATENT DOCUMENTS

| 3,860,900 | A | * | 1/1975 | Scudder ............................. 367/6 |
| 4,086,560 | A | * | 4/1978 | Johnston et al. ................ 367/100 |
| 4,229,809 | A | * | 10/1980 | Schwalbe ........................... 367/6 |
| 5,214,617 | A |   | 5/1993 | Rouquette |
| 5,615,175 | A | * | 3/1997 | Carter et al. .................... 367/124 |
| 5,691,957 | A |   | 11/1997 | Spiesberger |
| 6,366,533 | B1 | * | 4/2002 | English .......................... 367/131 |
| 2005/0180263 | A1 | * | 8/2005 | Lambert et al. ................ 367/128 |

(Continued)

FOREIGN PATENT DOCUMENTS

EP    0 446 111 A1    9/1991
FR    1 597 534       6/1970

(Continued)

OTHER PUBLICATIONS

International Search Report from PCT/NO2010/000037 dated May 19, 2010 (2 pages).

(Continued)

*Primary Examiner* — Isam Alsomiri
*Assistant Examiner* — Hovhannes Baghdasaryan
(74) *Attorney, Agent, or Firm* — Osha Liang LLP

(57) ABSTRACT

The invention consists of a method which comprises a plurality of steps for determining difference in distance from a reference point to at least two sensor modules 10, 20 that are located under water. The sensor modules 10, 20 comprise means for sending and receiving acoustic signals to each other and to a hydrophone 30 at the reference point. Connected to the hydrophone 30 is a calculating unit 40 that utilizes arrival time of the received signals from the sensor modules to determine difference in distance from the sensor modules (10, 20) to the reference point.

14 Claims, 4 Drawing Sheets

(56) References Cited

U.S. PATENT DOCUMENTS

| | | | | |
|---|---|---|---|---|
| 2007/0089349 | A1* | 4/2007 | Skjold-Larsen | 43/9.1 |
| 2008/0192575 | A1* | 8/2008 | Coleman | 367/115 |
| 2008/0304358 | A1* | 12/2008 | Mellier et al. | 367/19 |

FOREIGN PATENT DOCUMENTS

| | | | |
|---|---|---|---|
| GB | 1 221 169 | A | 2/1971 |
| GB | 2 173 900 | A | 10/1986 |
| JP | 7-198844 | A | 8/1995 |
| JP | 2000-147117 | A | 5/2000 |
| JP | 2001-050809 | A | 2/2001 |
| JP | 2005-46034 | A | 2/2005 |
| WO | 03/100451 | A2 | 12/2003 |

OTHER PUBLICATIONS

Written Opinion from PCT/NO2010/000037 dated May 19, 2010 (7 pages).
Norweigan Search Report for Application No. 20091726 dated Apr. 30, 2009 (2 pages).
Norweigan Search Report for Application No. 20090529 dated Sep. 1, 2009 (1 page).

* cited by examiner

METHOD FOR DETERMINING DIFFERENCE IN DISTANCE

The present invention comprises a method for determining difference in distance from a reference point to at least two sensor modules, all of which are located under water.

BACKGROUND OF THE INVENTION

Measurement of distances between sensor modules under water and a reference point, which, for example, is a vessel towing the sensor modules behind it, has been a well-known problem area which up to now has been solved by measuring the length of the line or wire between vessel and sensor modules. An alternative may be to send an acoustic signal from a reference point to a sensor module, and then measure the time it takes to receive a responding signal from the sensor module.

Accurate measurement of the line length has been found to be difficult in practice since the line may stretch, curve or twist. This is the case whether the length of line is measured manually as it leaves the vessel, or whether the number of rotations a winch has made in paying out and adjusting a certain length of line is measured. Furthermore, the last-mentioned is dependent on how the line is coiled, which may be different from one time to another. The problem is exacerbated when the distance between the sensor modules and the vessel becomes large, i.e., several hundred meters. A line or wire will then be able stretch quite considerably and become longer than when it is coiled up Today there are different devices for measuring distances under water using a measuring principle comprising transmission and reception of sound waves. This comprises primarily the use of sonar or echo sounders.

The principle of these devices is to emit a sound wave and measure the time it takes before the same sound wave is reflected. To find the distance from, for example, a vessel to one or more sensor modules, the sonar principle can be used by emitting a sound wave from the vessel and receiving reflections or transmitted signals from sensor modules towed behind the vessel. The time the sound waves take to pass to or from the sensor modules will then be proportional to the distance between them and the vessel. The last-mentioned principle is also used to find the distance between two or more sensor modules under water.

In a number of instances it is desirable to determine distance by only sending signals one way, from the sensor modules to a reference point which has a hydrophone to capture the signals.

In this case there arises a problem, which is that it is not known when signals from the sensor modules were sent, and it will thus be difficult to find the distance between sensor modules and reference point.

By sending signals from two or more sensor modules with a known time difference, the signals that are received by a hydrophone will indicate difference in distance between the sensor modules. This may be useful information per se if, for example, it is desirable that two or more sensor modules at all times should have a constant difference in distance or the same distance to, for example, a vessel towing them behind it.

A well-known problem when using sound waves under water is furthermore that the sound propagation velocity is dependent on a number of factors such as water temperature, salt content, pressure, etc. These will vary according to location, season, current conditions etc. It is the water temperature that has the greatest impact for the measuring result.

Several suppliers of sensor modules for use under water use a fixed velocity of 1500 m/s for propagation of sound waves, or the velocity of sound in water "is set" manually by look up relevant values for the sound velocity in water at a given temperature.

Water temperature in the vertical direction changes with depth. Warm water rises and cold water sinks down. In addition, the sun will warm the surface water.

The water temperature in the horizontal direction may also vary depending on distances and where measurements are made. For example, water close to the shore will have a higher temperature than water that is further from the shore.

There are some devices which have a temperature sensor incorporated for measuring the temperature locally in the water where the device is located. The disadvantage of such systems is that a water temperature measured locally at the location of, for example, an echo sounder may be very different from the water temperature along the whole propagation path of the sound wave. This will be the case, in particular, across large distances. The sound velocity that is then used in calculations of distances under water will be incorrect and result in large deviations in calculated distance in relation to the real distance.

The present invention solves the last-mentioned problem by measuring temperatures at at least one or more points along the path the sound will follow so as to collate them for a more accurate calculation of distances under water. This is done by transferring real measured temperature or calculated sound velocity from measured temperature to a unit connected to a hydrophone at the reference point for calculating distance under water. Greater accuracies will thus be obtained by a measurement of this kind.

Combining the emission of sound waves from at least two sensor modules and simultaneously adjusting the sound velocity in relation to measured water temperature will allow difference in distance to the sensor modules to be found with greater accuracy. This may, for example, be used for precise adjustment and positioning of a trawl.

SUMMARY OF THE INVENTION

The object of the present invention is to provide a method for determining difference in distance from a reference point to at least two sensor modules, all of which are located under water, wherein the sensor modules are in signal connection with each other in that they comprise means for sending and receiving acoustic signals, and wherein the reference point comprises a hydrophone for receiving acoustic signals from the sensor modules, said method being characterised by comprising the following steps:

sending a first acoustic signal from the first sensor module to the second sensor module;

sending acoustic signals from the second sensor module to the first sensor module and the hydrophone either immediately, or following set time delays after the second sensor module receives the said first acoustic signal sent from the first sensor module;

measuring in the first sensor module the time $T_1$ it takes from when the acoustic signal is sent from the first sensor module until the first sensor module receives the said acoustic signal sent from the second sensor module;

sending an acoustic signal, comprising the said time $T_1$, from the first sensor module to the hydrophone either immediately, or following a set time delay after the first sensor module receives the said acoustic signal sent from the second sensor module;

measuring arrival times of received acoustic signals on the hydrophone at the reference point; and determining the difference in distance from the reference point to each of the sensor modules by calculating this difference in a calculating unit connected to the hydrophone at the reference point based on measured arrival times of acoustic signals on the hydrophone, and on the time $T_1$ and optional set time delays.

Further features of the inventive method are defined in the dependent claims of the set of claims.

DETAILED DESCRIPTION

The present invention presents a method for calculating difference in distance from a reference point to at least two sensor modules, all of which are located under water. The solution is advantageous for the performance of various types of operations that take place under water, for example, in fisheries and the offshore industry. The invention will be of importance for operation of equipment, towing of fishing gear, seismic shooting etc. Other areas where the invention may advantageously be used are in the installation of, e.g., pipelines and subsea cables.

The invention will now be described in more detail with reference to the attached figures, wherein.

The invention is defined by a method for determining difference in distance from a reference point to at least two sensor modules 10, 20, all of which are located under water, and where the sensor modules 10, 20 are in signal connection with each other in that they comprise means for sending and receiving acoustic signals, and where the reference point comprises a hydrophone 30 for receiving acoustic signals from the sensor modules 10, 20, said method being characterised in that it comprises several steps that are carried out.

Figure 1:
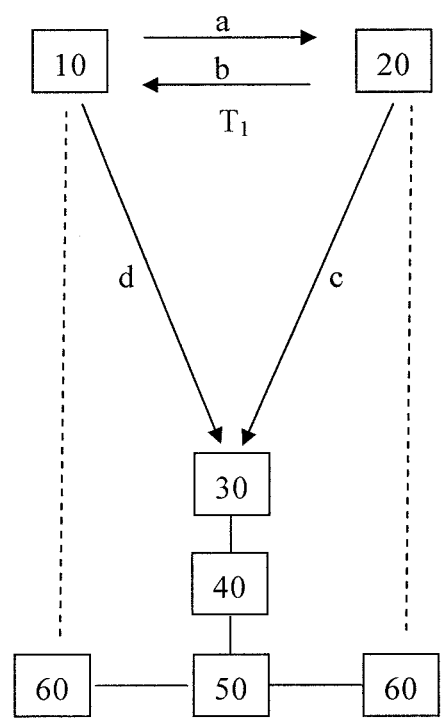
FIG. 1 illustrates how a calculating unit connected to a hydrophone can calculate the difference in distance between two sensor modules.

FIG. 1 indicates with arrows a) to d) the sequence and direction of acoustic signals which are sent between sensor modules 10 and 20 and a hydrophone 30. This allows a calculating unit 40 connected to the hydrophone 30 to calculate difference in distance to the sensor modules 10 and 20.

The first step in the inventive method is to send a first acoustic signal a) from the first sensor module 10 to the second sensor module 20.

The second step is to send an acoustic signal b) from the second sensor module 20 to the first sensor module 10 and the hydrophone 30, either immediately or following set time delays after the second sensor module 20 receives the said first acoustic signal a) sent from the first sensor module 10. A fixed time delay will in that case be known in advance to the first sensor module 10.

The third step is to measure in the first sensor module 10 the time $T_1$ it takes from when the acoustic signal a) is sent from the first sensor module 10 until the first sensor module 10 receives the said acoustic signal b) sent from the second sensor module 20. This measurement is made by measuring the time a signal a) takes from when it is sent from the first sensor module 10 until it receives a signal b) from the second sensor module 20, and subtracting an optional known time difference of emitted acoustic signal b) in the second sensor module 20 and dividing the remaining time measured by two.

The fourth step is to send an acoustic signal d) comprising the said time $T_1$ from the first sensor module 10 to the hydrophone 30 either immediately, or following a set time delay after the first sensor module 10 receives the said acoustic signal sent from the second sensor module 20.

Arrival times of received acoustic signals on the hydrophone 30 at the reference point are then measured. If one of the sensor modules 10, 20 has a longer distance to the vessel than the other, the signal received on the hydrophone 30 therefrom will take longer than the signal from the other. This will result in a time difference between the emitted acoustic signals from the sensor modules 10, 20.

The last step in the method is to determine the difference in distance from the reference point to each of the sensor modules 10, 20 by calculating this difference in a calculating unit 40 connected to the hydrophone 30 at the reference point based on measured arrival times of acoustic signals on the hydrophone 30, and on the time $T_1$ and optional set time delays.

This information can then be used to adjust and position the sensor modules 10, 20.

An object of the present invention is primarily to determine difference in distance from the reference point to each of the sensor modules 10, 20.

Another object is to use this information to adjust and position the sensor modules 10, 20 in relation to the said reference point.

The last-mentioned is visualised best in that the sensor modules 10, 20 are connected to devices the position of which it is desired to control and change.

In one embodiment the reference point may be connected to a vessel, and the sensor modules 10, 20 move in relation to the vessel.

In another embodiment the reference point may be connected to a fixed structure, and the sensor modules 10, 20 move in relation to the fixed structure.

The adjustment and positioning of the sensor modules 10, 20 as regards difference in distance between a reference point and each of the sensor modules 10, 20 can be carried out in that calculated differences in distances are sent to controller 50 which controls a control unit 60 that adjusts and positions the sensor modules 10, 20.

The last-mentioned can be done in that the sensor modules 10, 20 are towed behind, for example, a vessel via a line or wire that is fastened to trawl winches which control them in that the trawl winches are connected to said control unit 60.

Adjustment and positioning of sensor modules 10, 20 which are not necessarily attached to a trawl can be effected in that control signals are sent from the control unit 60 to sensor modules 10, 20 which travel behind the vessel with the aid of separate remote-controlled propulsion means.

The said reference point need not be a hydrophone on a vessel, but it may, for example, be connected to a fixed structure such as an offshore structure, the sensor modules 10, 20 moving in relation to the fixed structure. The inventive method will then be able to determine difference in distance, and optionally adjust and position the sensor modules 10, 20 in relation to the fixed structure based on calculated difference in distance.

Figure 2:
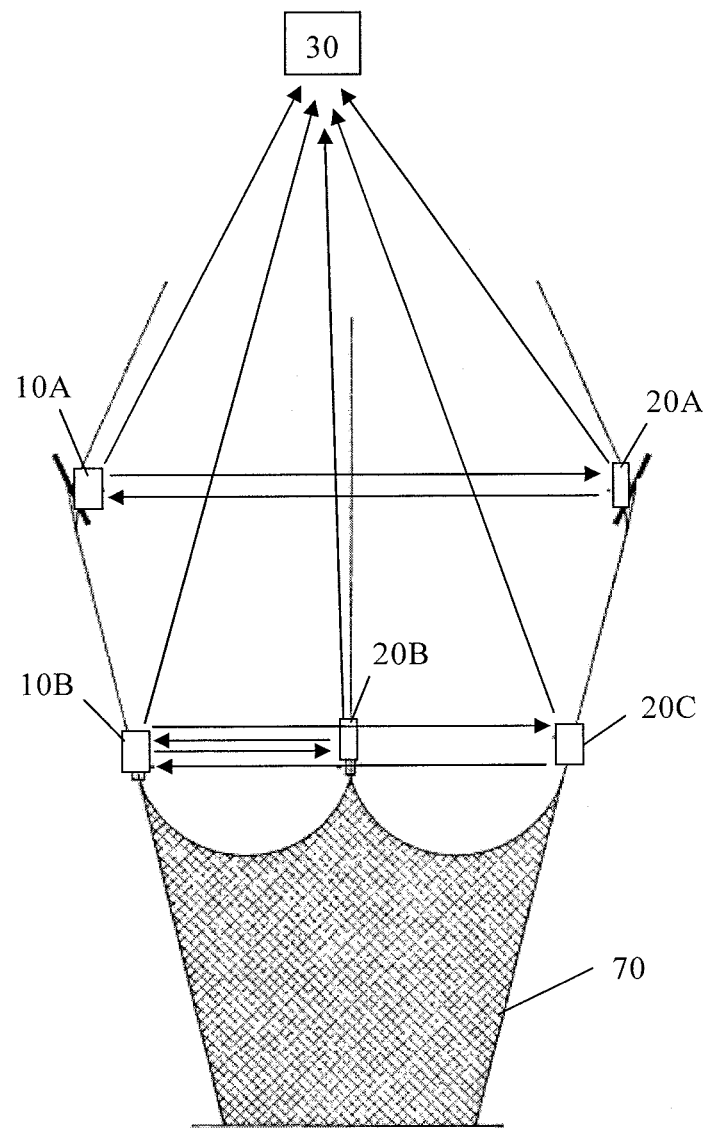
FIG. 2 shows a system for practical application of sensor modules for optimising a trawl operation.

FIG. 2 shows a system for practical application of sensor modules for optimising a trawl operation. In such a set-up, pairs of sensor modules 10A, 20A, 10B, 20C and 10B, 20B function as symmetry sensors that can be used to detect whether the opening of a trawl 70 is towed symmetrically behind a vessel or with desired and optimal symmetry. If this is not the case, the position and the opening of the trawl 70 can be adjusted and positioned such that desired symmetry is obtained.

In that the sensor modules 10A, 10B, 20A, 20B, 20C are attached at different points in connection with the trawl 70, it will be possible, through use of the inventive method, to detect difference in arrival time of signals on a hydrophone 30 on a vessel and calculate difference in distance from the vessel to the different sensor modules 10A, 10B, 20A, 20B, 20C and thus determining whether the trawl 70 is towed with desired symmetry. This information may then be used to control trawl winches either manually or automatically. The last-mentioned form of control is effected in that the controller 50 on the vessel controls winches 60 which adjust the lines to which the sensor modules 10A, 10B, 20A, 20B, 20C are attached. By using a plurality of sensor modules 10A, 10B, 20A, 20B, 20C which work together as pairs, as is shown in FIG. 2, further information may be supplied to the calculating unit 50, and more lines connected to the trawl can be adjusted.

Figure 3:
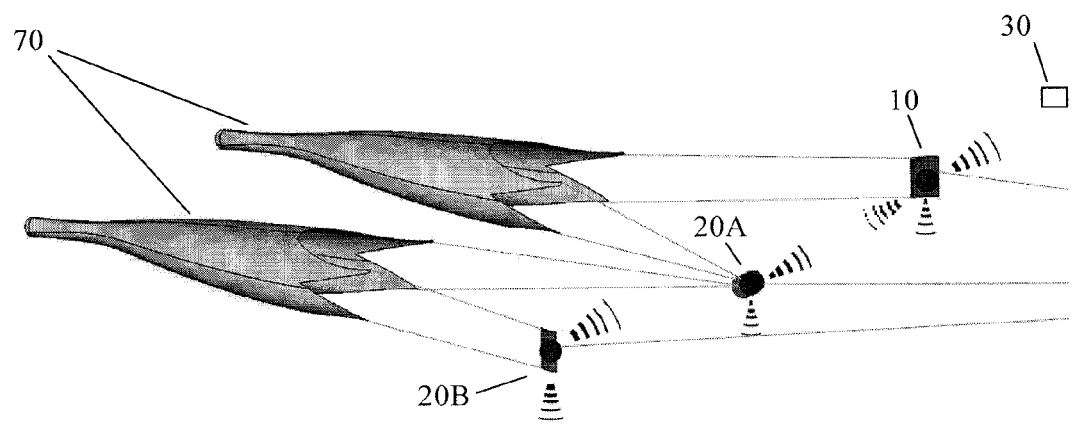
FIG. 3 shows sensor modules mounted in connection with a trawl.

FIG. 3 is a lateral section showing sensor modules 10A, 20A, 20B mounted in connection with trawl 70. The sensor modules 10A, 20A, 20B may be equipped with depth pressure cells and acoustic height indicators. The transfer of signals between the sensor modules will be similar to that mentioned above. The additional information of depth and height will be useful additional information in determining the difference is distance between the sensor modules 10A, 20A, 20B.

Figure 4:
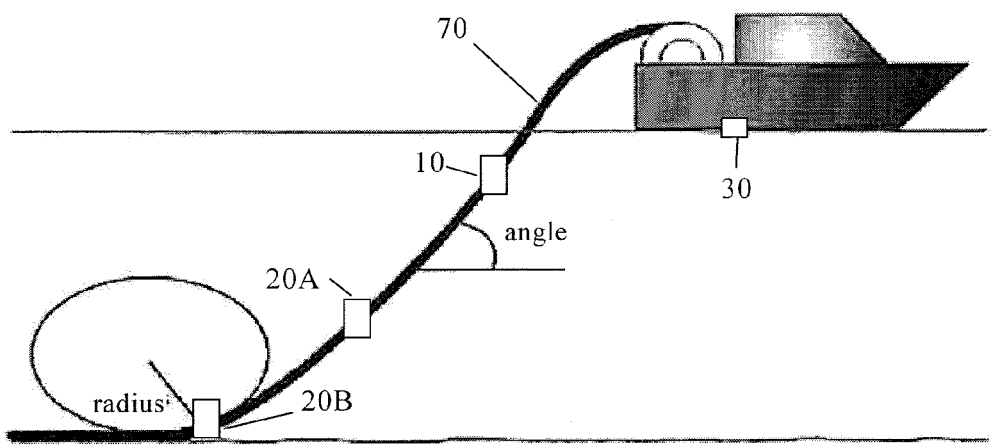
FIG. 4 shows sensor modules mounted on seismic cables.

FIG. 4 shows another example of the use of the inventive method by employing two or more sensor modules 10A, 20B, 20C attached to a seismic cable at differently spaced locations on the cable. The inventive method makes it possible to determine differences in distance from the sensor modules to a hydrophone 30 at a reference point, e.g., a vessel, such that the profile that the seismic cable has at any given time can be determined when the properties of the cable such as cross-section, rigidity etc. are known. As a streamer cable can be several kilometers in length, it may be favourable to correct for different speed profiles in the water.

FIGS. 2 to 4 show by way of example embodiments of the use of the method according to the invention. Embodiments are also conceivable where the calculating unit 40 receives position data from a GPS on a vessel that indicates the vessel's position, heading and speed. This will be useful additional information for adjusting and positioning the sensor modules 10, 20.

If the vessel also comprises acoustic means for sending signals to the sensor modules 10, 20 which, upon receiving these signals, send acoustic signals back to the hydrophone 30 on the vessel, the actual distance between the sensor modules 10, 20 and the hydrophone 30 will be determined, and not only the difference in distance between the sensor modules 10, 20 and the hydrophone 30.

Combining the information about distance between the sensor modules 10, 20 and the hydrophone 30 with the information about the vessel's position, heading and speed will allow the precise position of the sensor modules to be determined.

This will be important information when trawling in critical areas containing installations such as pipelines etc. In such places a precise positioning and handling of the trawl will be necessary to avoid damaging the trawl or equipment.

For further information about the position of the sensor modules 10, 20, their depth and height can, as mentioned, be measured using pressure sensors and height indicator. This information can be sent to the hydrophone 30 on the vessel in order to provide a precise three-dimensional (x, y, z) position of the sensor modules 10, 20 which in turn provides a better means of optimising and adjusting the position of the sensor modules 10, 20 and thus the equipment to which they are attached.

The present invention utilises measurement of the time that elapses from transmission to reception of sound under water. As previously mentioned, it is a well-known problem that measurements using sound waves under water can give uncertain measurements depending on a number of factors such as water temperature, salt content, pressure etc. Here it is the water temperature that has the greatest impact for the measuring result.

In order to carry out efficient fishing operations, and to optimise fuel consumption, it is necessary to have a high level of precision for measurements that are used to optimise a trawl operation.

By incorporating temperature measurements either by means of a temperature sensor in at least one sensor module or by using at least one separate temperature sensor, and sending the measured temperature of the water to the hydrophone 30 on the vessel, the calculating unit 40 on the vessel can use the measured temperature in accurate calculation of difference in distance to the sensor modules 10, 20.

In that a temperature sensor is also installed in the vicinity of the hydrophone 30 on the vessel, a temperature profile can be established along the sound propagation path of the acoustic signals, this profile giving correct sound velocity in water which can be used in calculating difference in distance and distance to the sensor modules 10, 20.

For optimal control of a trawl it is of importance to aim for optimal trawl geometry and towing speed throughout the trawl haul, also through changes in course, engine speed, propeller pitch, winches and changes in angles of trawl doors and sinkers. It goes without saying that this is a complex process which requires accurate information.

A change in each of the control parameters alone does not make it possible to obtain optimal trawl geometry. Only a combination of changes in two or more parameters simultaneously, depending on the conditions, makes it possible to obtain optimal trawl geometry, positioning of the trawl and correct towing speed, i.e., the speed of the trawl through the sea.

A complete system for adjusting and positioning a trawl in order to obtain optimal trawl geometry and towing speed throughout a trawl haul may comprise the use of the said sensor modules 10, 20, echo sounder, sonar, trawl sonar, GPS, wind gauge, seabed chart, wave gauge and winch data, and how the measuring data from these is used by the calculating unit 40 to control different parameters such as change in the vessel's course, engine speed, propeller pitch, winches and change in angle of trawl doors and sinkers.

Figure 5:
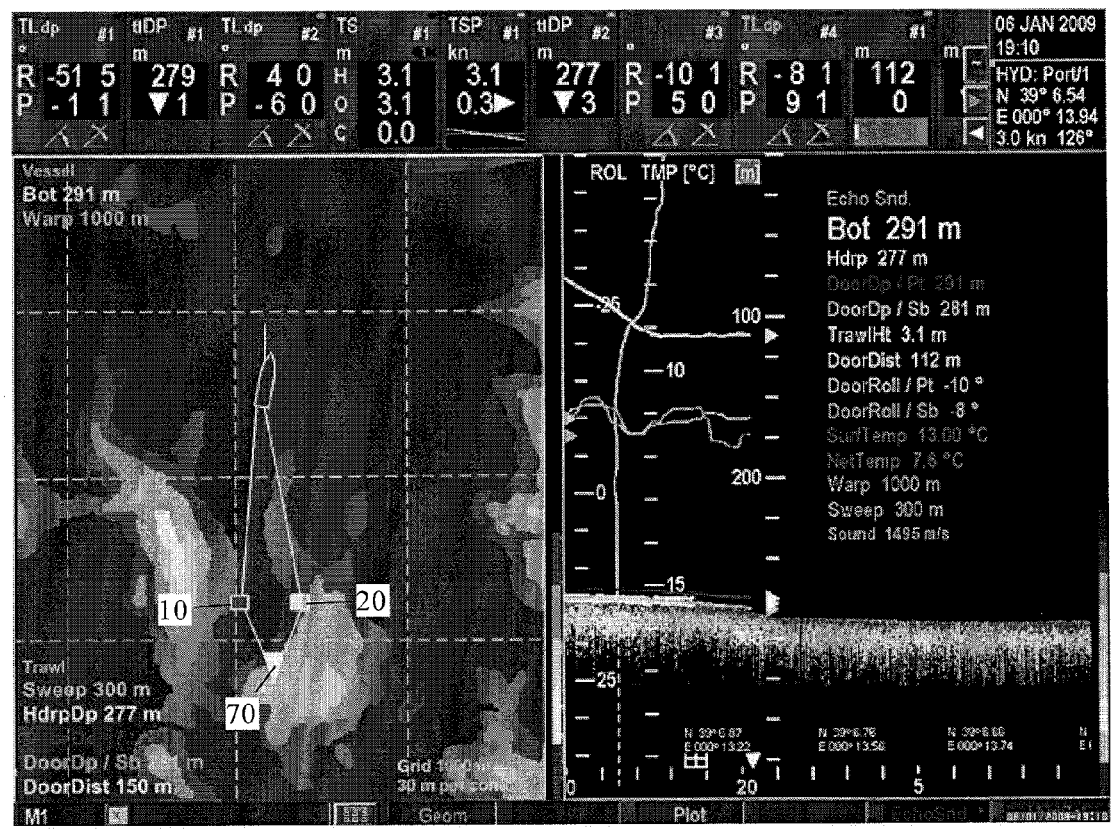
FIG. 5 shows a screen image for a trawl monitoring system.

FIG. 5 shows an example of a screen image for a trawl monitoring for trawling. Such a system will thus be connected to the said calculating unit 40. In the image on the left there is a representation of a trawl 70 and sensor modules 10, 20 in relation to a sea chart system. Due to temperature corrections and the said inventive positioning technology, the position of the trawl and the distance to the vessel will give the fisherman the precise position of his trawl in relation to the vessel.

In addition to providing information about the location of a vessel in relation to a seabed chart, such a screen image may also provide information about several different parameters related to sensor modules 10, 20 mounted on the trawl 70 as shown in the image on the right, where, inter alia, also the depth of the trawl doors is shown.

The inventive method makes it possible to adapt the aforementioned control parameters to each other. As the geometry of the trawl changes with changing seabed conditions, a change in trawl depth, speed and heading of underwater currents, degree of filling etc., correct information about the difference in distance between a set of sensor modules 10, 20 will provide important information for adjustment and positioning of the sensor modules 10, 20.

A person of skill in the art will appreciate that there are other types of applications of the invention without departing from its scope as defined in the set of claims.

The invention claimed is:

1. A method for determining difference in distance from a reference point to at least two sensor modules all of which are located under water, wherein the sensor modules are in signal connection with each other in that they comprise means for sending and receiving acoustic signals, and wherein the reference point comprises a hydrophone for receiving acoustic signals from the sensor modules the method comprising:
   sending a first acoustic signal from the first sensor module to the second sensor module;
   sending a second acoustic signal from the second sensor module to the first sensor module and the hydrophone either immediately, or following a set time delay after the second sensor module receives the first acoustic signal sent from the first sensor module;
   measuring in the first sensor module a time value $T_1$ it takes from when the first acoustic signal is sent from the first sensor module until the first sensor module receives the second acoustic signal sent from the second sensor module;
   sending an acoustic data signal, comprising the time value $T_1$, from the first sensor module to the hydrophone either immediately, or following a set time delay after the first sensor module receives the second acoustic signal sent from the second sensor module;
   measuring arrival times of received acoustic signals on the hydrophone at the reference point; and
   determining the difference in distance values from the reference point to each of the sensor modules by calculating this difference in a calculating unit connected to the hydrophone at the reference point based on measured arrival times of acoustic signals on the hydrophone and on the time value $T_1$ and optional set time delays.

2. A method according to claim 1, wherein the reference point is connected to a vessel, and where the sensor modules move in relation to the vessel, and the method further comprising:
   adjusting and positioning the sensor modules in relation to the vessel based on calculated difference in distance.

3. A method according to claim 2, wherein the adjustment and positioning of the sensor modules is effected in that the sensor modules are towed behind a vessel via a line or wire that is fastened to trawl winches that control them.

4. A method according to claim 2, wherein the adjustment and positioning of the sensor modules is effected in that control signals are sent to the sensor modules which travel behind the vessel with the aid of separate remote-controlled propulsion means.

5. A method according to claim 2, wherein the reference point is connected to a fixed structure, and where the sensor modules move in relation to the fixed structure, and wherein the method further comprising:
   adjusting and positioning the sensor modules in relation to the fixed structure based on calculated difference in distance.

6. A method according to claim 2, further comprising use of a GPS on the vessel to determine the vessel's position, heading and speed, this information being used in the adjustment and positioning of the sensor modules.

7. A method according to claim 2, wherein the vessel also comprises acoustic means for sending signals to the sensor modules which, upon receipt of these signals, send acoustic signals back to the hydrophone on the vessel such that distances from sensor modules to the hydrophone can be determined.

8. A method according to claim 7, wherein the information about the vessel's position, heading, and speed is combined with the distance from the hydrophone to the sensor modules, such that the precise position of the sensor modules can be determined.

9. A method according to claim 1, further comprising:
   measuring depth, of at least one of the sensor modules, this information being sent to the hydrophone at the reference point to provide further information about the sensor modules.

10. A method according to claim 1, wherein at least one sensor module comprises a temperature sensor, and wherein the method further comprises:
    measuring the temperature of the water and sending this information to the hydrophone at the reference point, and where the calculating unit connected to the hydrophone utilizes the measured temperature in the calculation of the difference in distance to the sensor modules.

11. A method according to claim 10, wherein a temperature profile along the sound propagation path of the acoustic signals is established, this profile being used in the calculation of difference is distance to the sensor modules.

12. A method according to claim 1, wherein the first and second sensor module are attached to their respective trawl door on a trawl, such that the position and the opening of a trawl can be adjusted and positioned to obtain a constant and optimal trawl geometry.

13. A method according to claim 1, wherein two or more sensor modules are fastened to a seismic cable at differently spaced locations on the cable in order to be able to determine the distance between a reference point and the sensor modules and the profile that the seismic cable has at any given time.

14. A method according to claim 1, further comprising:
    providing a complete and automatic system for adjustment and positioning of a trawl in order to obtain optimal trawl geometry and towing speed during a trawl haul, by using said sensor modules and at least one of the equipment group consisting of: an echo sounder, a sonar, a trawl sonar, a GPS, a gyro, a wind gauge, a wave gauge, a winch data, and a seabed chart, and
    wherein a measuring data obtained from the sensor modules and the equipment group is used by the calculating unit to control different parameters in order to alter one of: the course of a vessel, an engine speed, a propeller pitch, one or more winches, and an angle of a trawl door and one or more sinkers.

* * * * *